(12) United States Patent
Knaus et al.

(10) Patent No.: US 7,721,754 B2
(45) Date of Patent: May 25, 2010

(54) TAPPING TEE ASSEMBLY WITH CAP ASSEMBLY

(75) Inventors: Jason Knaus, Painesville, OH (US); Shawn Houlahan, Aurora, OH (US); Brent Carrick, Geneva, OH (US)

(73) Assignee: Elster Perfection Corporation, Madison, OH (US)

( * ) Notice: Subject to any disclaimer, the term of this patent is extended or adjusted under 35 U.S.C. 154(b) by 160 days.

(21) Appl. No.: 11/938,047

(22) Filed: Nov. 9, 2007

(65) Prior Publication Data

US 2008/0121284 A1     May 29, 2008

Related U.S. Application Data

(60) Provisional application No. 60/865,593, filed on Nov. 13, 2006.

(51) Int. Cl.
*F16L 47/34*     (2006.01)
*F16L 41/06*     (2006.01)

(52) U.S. Cl. ........................................ 137/318; 285/197

(58) Field of Classification Search .................. 137/318, 137/15.14, 15.13, 317; 285/197
See application file for complete search history.

(56) References Cited

U.S. PATENT DOCUMENTS

| | | | | |
|---|---|---|---|---|
| 3,756,261 | A * | 9/1973 | Minchhoff | 137/15.14 |
| 4,809,735 | A | 3/1989 | Volgstadt et al. | |
| 5,425,395 | A | 6/1995 | Brennan | |
| 5,577,529 | A * | 11/1996 | Katz | 137/318 |
| 7,246,634 | B2 * | 7/2007 | Maier et al. | 137/318 |
| 7,302,965 | B2 * | 12/2007 | Ishikawa et al. | 137/318 |

\* cited by examiner

*Primary Examiner*—Kevin L Lee
(74) *Attorney, Agent, or Firm*—Fay Sharpe LLP

(57) ABSTRACT

A tapping tee assembly and method for tapping a conduit and fluidly connecting to the conduit include a body defining a conduit recess for receiving the conduit and further defining a main passage with a cover disposed therein. The main passage has a first end adjacent the conduit recess and a second, open end spaced apart from the first end. The second end is closed by a cap. The body of the tapping tee assembly is secured to the conduit with the conduit received in the conduit recess. The cutter is advanced along the main passage toward the conduit without removal of the cap from the body to tap the conduit and fluidly connect the conduit and the main passage.

14 Claims, 6 Drawing Sheets

TAPPING TEE ASSEMBLY WITH CAP ASSEMBLY

This application claims the priority benefit of U.S. provisional application Ser. No. 60/865,593, filed Nov. 13, 2006, the disclosure of which is incorporated herein by reference.

BACKGROUND

The present disclosure generally relates to the art of tapping conduits, pipes or tube-like workpieces and more particularly to tapping an existing conduit for connection with another conduit. In one embodiment, a tapping tee assembly and method are provided with an improved cap assembly for tapping into an existing plastic conduit (e.g., a gas main or a water main) to establish fluid communication between the plastic conduit and another, secondary conduit without requiring removal of the cap assembly. Though the present disclosure will describe the afore-described embodiment in particular detail, it is to be appreciated that the subject matter described herein has broader applications and may be advantageously employed in related environments and applications.

Polymer and plastic piping has become ubiquitous in many industries and is used within many varying types of pipeline networks (e.g. water pipelines, gas pipelines, etc.). The pipeline network typically includes pipe mains, which are often buried, for conveying the carried fluid (e.g., water or gas) to various locations and service lines, which interconnect a home or business with a selected pipe main. In particular, the pipe main is often an existing or previously installed main that continuously carries a fluid (i.e., a live main), the shutting down of which is highly discouraged and inconvenient. Tapping tees are frequently and advantageously used for connecting secondary conduits, such as service lines, to pipe mains, particularly when the secondary conduit is to be installed to a live main. A tapping tee can incorporate a drill-like or cutting tool with a mounting collar for allowing the tee to be positioned at any desired location along the main.

Typically, the tee is first attached to the main by using a split collar arrangement or, alternately, the tee may be fused to the main. Thereafter, the cutting tool is advanced through the sidewall of the main to open a fluid passage between the main and tapping tee. The tapping tee often includes appropriate structure for more easily and conveniently connecting to the secondary conduit, wherein such connection is often completed prior to tapping the main (i.e., advancing the cutting tool to establish fluid communication). One advantage of such a tapping tee is that it is not necessary to actually sever the entire main, or otherwise interrupt service provided through the main, in order to interconnect the tee. Rather, the tapping tee requires only that a hole be drilled into the main in order to provide for fluid communication therewith.

One exemplary mechanical tapping tee for use in connecting a service line to a main is disclosed in commonly owned U.S. Pat. No. 4,809,735, which is expressly incorporated herein by reference. In particular, the '735 patent discloses a tapping tee assembly including a surrounding saddle or support assembly that is received around the main conduit. A generally cylindrical body is integrally formed with the support assembly and receives a tapping assembly therein. An internally threaded passage extends through the body and is generally perpendicular to the longitudinal axis of the main line. The cylindrical body includes an exterior threaded region that selectively retains a cap in threaded engagement on the body to close an open, upper end of the passage. The tapping assembly is threadedly received in the internally threaded passage and can be selectively advanced or retracted by an appropriate tool when the cap is removed thereby providing access into the passage to the tapping assembly.

More particularly, the tapping assembly includes a cutter member that, when the cap is removed, can be selectively threadedly advanced through a sidewall of the main conduit, forming an opening as it is rotated through the sidewall. Specifically, a spreading or tapered portion of the cutter member advances through the opening to firmly grip the inner wall of the main conduit when properly positioned in place. An elongated portion of the cutter member remains within the main conduit, generally radially inward of the tapered portion. An upper portion of the tapping assembly is subsequently threadedly retracted from the cutter member to establish fluid communication from the main line, through apertures provided in the cutter member, and to a branch or service line connected to the body. Once access to the tapping assembly is no longer needed and fluid communication with the main conduit has been established, the cap can be replaced on the body to close the upper, open end of the passage. The '735 patent also discloses a second embodiment wherein a two-part cutter is again used, but is modified so that material cut from the sidewall of the main conduit, or coupon as it is generally referred to, is removed from the interior of the main conduit. In most other respects, this modified embodiment works in much the same way to establish a fluid passage from the main conduit to a branch passage or service line.

Another exemplary mechanical tapping tee for use in connecting a service line to a main is disclosed in commonly owned U.S. Pat. No. 5,425,395, which is also expressly incorporated herein by reference. In particular, the '395 patent discloses a tapping tee assembly including a body member having an internal passage that receives a tapping apparatus comprised of a cutter having a cutting edge at one end thereof and a sleeve received over the cutter. Like the '735 patent, the body member includes exterior threads for selectively retaining a cap in threaded engagement on the body member to close an open, upper end of the internal passage. When the cap is removed, the tapping apparatus in the internal passage is accessible for selective advancement or retraction.

In particular, the cutter has external threads which enable the tapping apparatus to be advanced, when the cap is removed, to form an opening in a sidewall of the main about which the body member is secured. A retainer member, such as an o-ring, can be used to hold the sleeve and cutter together, particularly during advancement of the tapping apparatus, and the sleeve can include external threads that grip into the main's sidewall. After forming the sidewall opening and threadedly engaging the sleeve with the sidewall, retraction of the cutter leaves the sleeve in place to secure the tapping apparatus to the main and establish fluid communication therethrough. The external threads of the cutter and sleeve preferably have different thread pitches so that the sleeve advances at a slightly faster rate than the cutter to facilitate sealing engagement between the main and the body member. A one-way drive arrangement is advantageously provided between the sleeve and cutter so that once the sleeve is positioned in the main, the cutter can be removed without altering the location of the sleeve. An o-ring can be provided annularly about and radially spaced from the sleeve to sealingly engage around the opening formed by the cutter through the sidewall of the main. Also like the '735 patent, the cap can be replaced on the body to close the internal passage after access to the tapping apparatus is no longer needed (i.e., after fluid communication with the main is established and the cutter has been retracted).

The mechanical tapping tees of the '735 and '395 patents have been commercially successful and are able to provide a leakproof seal with the mains to which the tapping tees are connected. However, one drawback with these tapping tees is that access to the internally disposed tapping apparatus is only achieved by removing the cap from the body in which the tapping apparatus is disposed. Thus, advancement and retraction of the tapping apparatus and its cutter can only occur while the cap is removed. This may not be desirable in certain applications because the fluid carried by the main may escape through the passage after fluid communication is established with the main and prior to the cap being secured to the body to close and seal the internal passage.

SUMMARY

According to one aspect, a mechanical tapping tee assembly is provided for fluidly connecting to a conduit. More particularly, in accordance with this aspect, the tapping tee assembly comprises a body defining a conduit recess for receiving the conduit in close relation relative to the body and further defining a main passage for fluidly connecting the conduit recess to a branch passage. The main passage is defined in the body with a first end adjacent the conduit recess and a second, open end spaced apart from the first end. A threaded cutter is received in the main passage and is threadedly engaged with a threaded region of the main passage for selective advancement and retraction within the main passage upon rotation relative to the body, the cutter includes a cutting edge for, selective advancement toward the conduit received in the conduit recess, cutting through a side wall of the conduit to establish fluid communication between the main passage and the conduit. A cap assembly is secured to the body for closing the second, open end of the main passage. The cap assembly allows rotation of the cutter received in the main passage without removal of the cap assembly from the body.

According to another aspect, a method for tapping a conduit is provided. More particularly, in accordance with this aspect, a tapping tee assembly is provided including a body defining a conduit recess for receiving the conduit and further defining a main passage with a cutter disposed therein. The main passage has a first end adjacent the conduit recess and a second, open end spaced apart from the first end. The second end is closed by a cap. The body of the tapping tee assembly is secured to the conduit received in the conduit recess. The cutter is advanced along the main passage toward the conduit without removal of the cap from the body to tap the conduit and fluidly connect the conduit and the main passage.

According to yet another aspect, a leakproof tapping tee assembly is provided for tapping into a conduit to establish fluid communication between the conduit and another, secondary conduit. More particularly, in accordance with this aspect, the tapping tee assembly comprises a body including one or more saddle sections defining a conduit recess for receiving the conduit in close cooperating relation. The body defines a main passage extending from adjacent the conduit recess outwardly away from the conduit to an open end spaced apart from the conduit recess. An externally threaded cutter is received in the main passage and is threadedly engaged with a threaded region of the main passage for selective advancement and retraction within the main passage upon rotation of the cutter relative to the body. The cutter includes a cutting edge for cutting through a side wall of the conduit to establish fluid communication between the main passage and the conduit. A cap assembly sealingly closes the open end of the main passage while permitting selective rotation of the cutter.

According to still yet another aspect, a tapping tee assembly is provided for fluidly connecting to a conduit. More particularly, in accordance with this aspect, the assembly comprises a body defining a conduit recess for receiving the conduit in close relation relative to the body and further defining a main passage for fluidly connecting the conduit recess to a branch passage. The main passage is defined in the body with a first end adjacent the conduit recess and a second, open end spaced apart from the first end. A threaded cutter is received in the main passage and is threadedly engaged with a threaded region of the main passage for selective advancement and retraction within the main passage upon rotation relative to the body. The cutter includes a cutting edge for, upon selective advancement toward the conduit received in the conduit recess, cutting through a side wall of the conduit to establish fluid communication between the main passage and the conduit. A cap assembly is secured to the body for closing the second open end of the main passage. Means for rotating the cutter without removing the cap assembly is provided to selectively advance the cutter toward the conduit.

DETAILED DESCRIPTION

Figure 7:
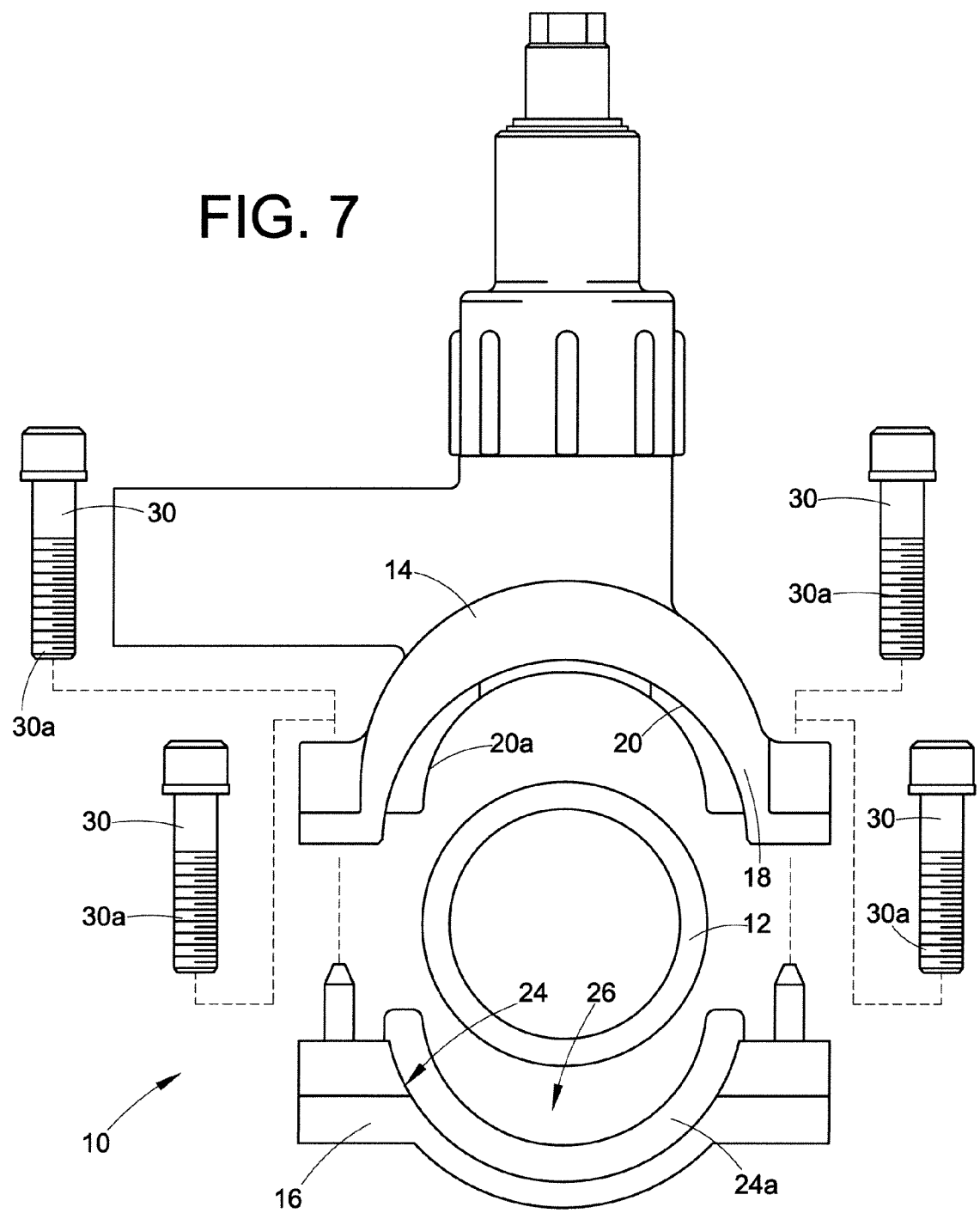
FIG. 7 is an exploded view of the tapping tee assembly and a conduit about which the tapping tee assembly can be securely clamped.

Referring now to the drawings wherein the showings are for purposes of illustrating one or more exemplary embodiments, the FIGURES show a method and apparatus for tapping and fluidly connecting to an associated tubular or pipe-like member such as a gas or water main or the like. More particularly, as best shown in FIG. 7, a mechanical leakproof tapping tee assembly 10 includes a body 14, 16 that can be securely clamped to an associated tubular member or main 12 (e.g., a water or gas main). The tapping tee assembly 10 of the illustrated embodiment employs a split ring or collar arrangement that includes a first or upper clamp portion 14 and a second or lower clamp portion 16 which together form the body 14, 16. As will be appreciated and understood by those skilled in the art, the upper and lower clamp portions 14, 16 of the body can both be formed of a polymer or plastic material, as can the main conduit 12 onto which the portions are secured.

The upper clamp portion 14 includes an arcuate saddle member 18 having a generally semi-cylindrical inner surface 20, also referred to herein as a curvilinear recess or area, adapted to closely receive or conform to a portion of the cylindrical outer surface of the tubular member or main conduit 12 and includes a predetermined array of radially inward extending, circumferentially disposed ridges 20a. These ridges, which are axially spaced apart, facilitate frictional engagement between the arcuate saddle member 18 and the main conduit 12, inhibiting relative rotation therebetween. In the illustrated arrangement, the inner surface 20 is configured to cover approximately one-half the circumference of the main conduit 12 along a limited axial extent of the main conduit.

Figure 5:
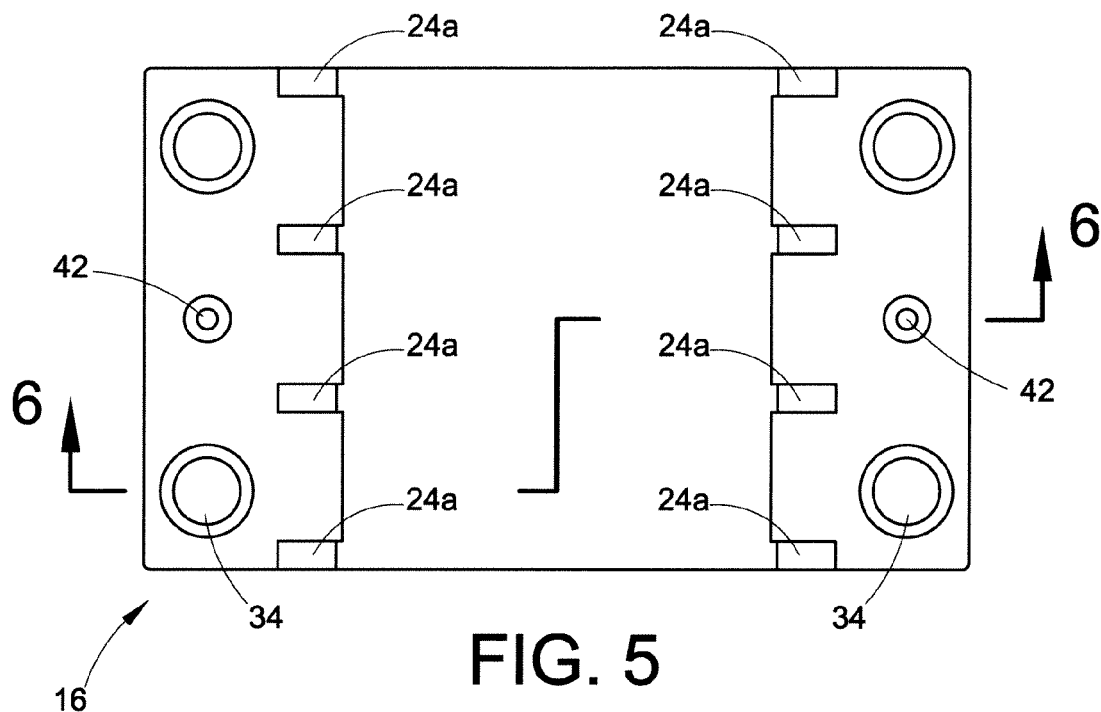
FIG. 5 is a topside plan view of a lower clamp portion of the tapping tee assembly.
Figure 6:
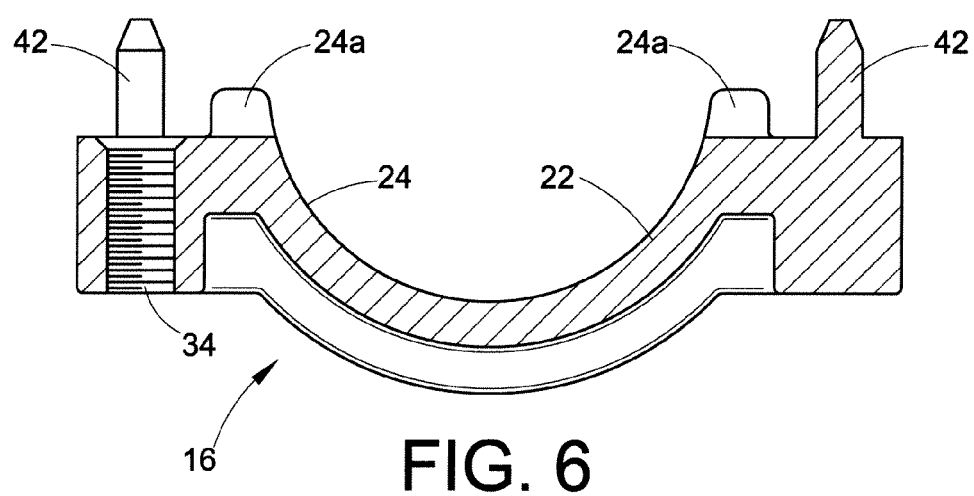
FIG. 6 is a cross section view of the lower clamp portion taken along the line 6-6 of FIG. 5.

Similarly, the lower portion 16 has an arcuate saddle member 22 having an inner, semi-cylindrical surface 24, also referred to herein as a curvilinear recess or area, adapted to closely receive or conform to a portion of the outer circumferential surface of the conduit 12. As best shown in FIGS. 5 and 6, the lower portion 16 can include raised rib portions 24a that align axially with the ribs 20a of the upper portion 12 when the tapping tee assembly is secured to the conduit 12. As illustrated, the raised portions 24a can protrude into the upper portion 14 to provide a more secure engagement between the portions 14,16. Like the surface 20, the inner surface 24 of the lower portion 16 can be configured to cover approximately one-half the total circumference of the main conduit 12 along a limited axial extent thereof. By the surfaces 20, 24, the body 14, 16 defines a conduit recess 26 that is configured to receive the conduit 12 in close relation relative to the body (i.e., the surfaces 20, 24 and the conduit outer surface are complementary to one another). In particular, the surfaces 20, 24 of the illustrated embodiments form a circumferentially continuous surface that surrounds the conduit 12 when received in the conduit recess 26.

As is known and understood by those skilled in the art, a fastening arrangement can be used to secure the first and second body portions 14, 16 together and provide clamping engagement about the outer surface of the conduit 12 when the conduit 12 is disposed in the conduit recess 26 between the portions 14, 16. In the illustrated embodiment, with further reference to FIG. 7, the fastening arrangement includes a plurality of individual fasteners 30 that are received through aligned apertures defined or provided in both the upper and lower clamp portions 14,16. The fasteners 30 can be bolt-type fasteners having threads 30a extending axially along one end thereof and can be formed of nylon or any other suitable material. In the illustrated embodiment, the fasteners 30 are inserted through apertures 32 in the upper clamp portion 14 and threadedly engaged within threaded apertures 34 defined in the lower clamp portion 16, the apertures 32,34 being in registry with one another when the clamp portions 14,16 are secured about the conduit 12. In addition, as shown, alignment apertures 44 can be provided in the upper clamp portion 14, which can receive alignment pins 42 formed integrally with the lower clamp portion 16. The alignment pins 42 can provide a light interference fit with the apertures 44 of the upper portion 14 for holding the body 14,16 together about the conduit 12 when attaching thereto.

Of course, the fastening arrangement need not be as shown and described in reference to the illustrated embodiment. For example, the apertures 32 of the upper clamp portion 14 could also be threaded to threadedly engage with the fasteners 30 received therethrough or, alternately, the fasteners could be of an increased length and a threaded member (e.g., a nut) could simply be received threadedly on one end of the fastener. Alternately, fastening structures could be formed integrally with one of the upper and lower clamp portions 14,16. Such integrally formed fastening structures could then be received through corresponding apertures defined in the other of the upper and clamp portions. With integral fastening structures, caps or some other threaded member (e.g., nuts) can be threadedly received on a distal end of each fastening structure that extends through a corresponding aperture. Tightening of such caps on the threaded distal ends of the corresponding fastening structures can function to securely clamp the body (e.g., the upper and lower clamp portions 14, 16), and thus the tapping tee assembly 10, about the circumference of the tubular main conduit 12. Still further, the fasteners could be molded into one of the upper and lower clamp portions 14,16. For example, threaded fasteners, such as bolts, could be molded into the lower clamp portion 16. In most respects, such molded-in fasteners would function like integrally formed fasteners, but would allow for the clamp portion in which they are molded-in (e.g., the lower clamp portion 16) to be formed of a first material, such as a polymer or plastic material, and the molded-in insert or fastener to be formed of a second, different material, such as stainless steel.

To assist in providing a leak free connection, the first body portion 14 includes an annular recess structure 36 protruding from the surface 20 and defining an annular recess or groove 38. A seal, such as an o-ring seal 36a, can be received in the recess 38 for sealing engagement with the main conduit, particularly after the fastening arrangement is used to secure the body 14, 16 of the tapping tee assembly 10 to the main conduit 12. In particular, in the illustrated embodiment, the first portion 12 defines the annular recess 38 in which the seal 38a is received for sealing between the body 12, 14 and the conduit 12 when the clamping portions 14, 16 are secured together and clamped onto the conduit 12. As described in further detail below, the annular recess 36 and the seal 38 are located on the inner surface 20 so as to be annularly disposed about a location at which cutter 72 cuts through a sidewall of the conduit 12.

In the illustrated embodiment, a tapping tee tower 50 is included on and formed integrally with the upper clamp portion 14. The illustrated tower 50 includes a first member or branch 52 that extends normally outward relative to a longitudinal axis of the main conduit 12 when the tapping tee assembly 10 is installed on the main conduit. The branch 52 can have a generally cylindrical configuration, although other configurations could be used with equal success. A first or main passage 54 extends through the tower 50, and particularly through the branch 52 in the illustrated embodiment, and includes an internal threaded portion 56 extending axially over at least a portion of an axial extent of the passage 54. The main passage 54 is generally aligned with the annular recess 38 such that the recess is positioned radially outwardly relative to the main passage. An internal shoulder 58 is provided in the main passage 54 for reasons which will become more apparent below.

Communicating with the main passage 54 is a second or branch passage 62, which is defined by a second generally cylindrical member or branch 64. In the illustrated embodiment, the branch 64 extends from the first branch 52 in a direction orthogonally oriented relative to a plane defined by an axis of the first branch 52 and the longitudinal axis of the main conduit 12. The branch passage 62 is adapted for communication with a service line or other individual hookup (not shown), details of which are well known in the art and require no further description therein. Preferably, the branch 64 is also integrally formed with the first body portion 14 so that it can be installed with the tower 40 in a single structure. Alternatively, separate components can be used although they may not be as conducive to ease of assembly and installation.

The tapping tee assembly 10 also includes a tapping apparatus 70 comprising a first component or cutter 72 and a second component or sleeve 74. The cutter 72 includes a first radial portion 76 having an annular cutting edge 78 provided at a first end 80. The cutting edge 78 can be partially defined by a circumferential taper 82 provided at the first end 80 in an exterior surface 84 of the first radial portion 76. As will be described in more detail below, the cutting edge 78 is dimensioned or configured for ultimately cutting through a sidewall of the main conduit 12 for establishing fluid communication between the main conduit and the passages 54,62 so that fluid in the main conduit 12 can be provided to a service line attached to the second branch 64.

The cutter 72 further includes a second radial portion 86 having an externally threaded region 88. In particular, the threaded cutter 72 and the sleeve 74 are received in the main passage 54 when the tapping tee assembly 10 is fully assembled. The threaded cutter 72, particularly threaded region 88, is threadedly engaged with the threaded region 56 of the main passage 54 for selective advancement and retraction within the main passage 54 upon rotation relative to the body 14, 16. The threaded region has a first preselected thread pitch that cooperates with the internally threaded portion 56 of the main passage 54. Upon rotation of the cutter 72 relative to the body, the cutter is either axially advanced or retracted from the main conduit 12 depending on the direction of rotation.

A tool receiving recess 90, such as a hex-shaped tool socket, is defined in a second end 92. Interposed between the first and second ends 80,92, a circumferential groove 94 is defined in the exterior surface 84 of the first radial portion 76. The groove 94 receives a resilient member 96, such as an o-ring, which is adapted for providing an interference, sealing fit with the sleeve 74. One purpose of the o-ring 96 is to at least temporarily retain the sleeve 74 and cutter 72 together in an initial assembled state, particularly when the sleeve and cutter are handled externally of the tower 40, but permit relative movement when the cutter 72 is advanced and retracted within the tower. The second radial portion 86 also includes a first ratchet region or element 98 that provides for selective driving between the cutter and the sleeve as described in more detail below.

In the illustrated embodiment, a passage 100 extends axially through the cutter 72 from the first end 80 to the second end 92. In this embodiment, the recess 90 is but a portion of the passage 100 that is adjacent the second end 92. Adjacent the first end 80, a portion 102 of the passage 100 diametrically expands to form a thinned wall section 104 which, together with the taper 82, defines the cutting edge 78. As will be described below in more detail, the diametrically expanded portion or recess 102 is adapted to, and axially sized to, receive a cutout portion or coupon created by the cutting edge 78. Internal threads 106 can be provided along the portion 102 extending radially inwardly from the thinned wall section 104 for retaining a coupon received within the recess or portion 102 as will be further described below.

The sleeve 74 is a generally tubular or hollow cylindrical member having external threads 112 extending axially inwardly from a first end 114 and a radially extending shoulder 116 at or adjacent a second end 118. When the tapping apparatus 70 is fully assembled, the sleeve 74 is received around the cutter 72. The sleeve 74 is dimensioned for close receipt around the cutter 72 and forms an interference fit therewith via the o-ring 96. The threads 112 advance into and threadedly grip the sidewall of the main conduit after the cutting edge 78 of the cutter 72 has removed a portion of the main conduit sidewall, typically referred to as a "coupon." The threads 112 can extend axially along the sleeve 74 a dimension sufficient to engage along the entire depth of the sidewall. As described further below, the threads 112 remain threadedly engaged with the conduit 12 when the cutter 70 is retracted with the conduit coupon.

A second cooperating ratchet region or element 120 is provided at the second end 118 of the sleeve 74. The ratchet element 98 of the cutter 72 and ratchet element 120 of the sleeve 74 are each defined by a series of sloped or ramped shoulders. The ramped shoulders are circumferentially spaced apart and provide for a one-way driving engagement between the cutter 72 and sleeve 74. Thus, the ratchet elements 98,120 cooperate (i.e., the sloped shoulders engage) with one another to provide driving rotatable and axial movement to the sleeve 74 as the cutter 72 is rotated in a first direction (e.g., advancing direction relative to the main conduit). Rotation of the cutter 72 in a second, opposite direction (e.g., retracting relative to the main conduit) allows the tapered surfaces to slide one over the other and thus no axial movement is imparted to the sleeve by the cutter. As will be appreciated and understood by those skilled in the art, other driving arrangements can be used with the illustrated tapping tee assembly 10, including other one-way driving arrangements. For example, rather than sloped shoulders, opposed continuous helical edges can be provided on the cutter and the sleeve as shown and described in the afore-referenced '395 patent.

The external threads 112 on the sleeve 74 can have a second preselected thread pitch that is different or varies from the thread pitch on the threads 88 of the cutter 72. Specifically, a greater number of threads per inch can be provided on the cutter 72 than on the sleeve 74. By way of example only, the thread pitch on the cutter 72 can be eight threads per inch while the thread pitch on the sleeve 74 can be approximately six threads per inch. This relationship requires a lesser number of turns to advance the sleeve 74 a predetermined distance than are required to axially advance the cutter 72 the same distance or dimension.

The tapping tee assembly 10 of the illustrated embodiment further includes a cap assembly 130 secured to the body 14, 16 for sealingly closing the upper, open end 54a of the main passage 54 while continuing to permit selective rotation of the tapping apparatus 70, including the cutter 72. That is, the cap assembly 130 allows rotation of the cutter 72 received in the main passage 54 without removal of the cap assembly 130 from the body 14, 16. More particularly, the tower 50 of the illustrated embodiment includes an exterior threaded region 132 adjacent the upper end 52a of the first branch 52 for threadedly receiving a cap 134 of the cap assembly 13 thereon. In particular, the cap 134 includes internal threads 136 that threadedly engage the external threaded region 132 of the tower 50 to secure the cap 134 to the body 14, 16 and close the open end 54a of the main passage 54. In the illustrated embodiment, the tower 50 defines an external shoulder 138 adjacent an upper end of the external threaded region 132 for engaging an internal shoulder 140 of the cap 134 and limiting axial advancement of the cap onto the tower. Alternately, the cap 132 could be secured and/or sealed to the tower 50 by some other means. For example, the cap 132 could be fused to the tower 50.

A second shoulder 142 is defined by the tower 50 for supporting an annular seal or o-ring 144. The seal 144 is radially disposed between the cap 134 and the body 14, 16 to seal therebetween. Both shoulders 138,142 are annularly disposed on the tower 50, but the second shoulder 142 is more closely adjacent the end 52a and is diametrically smaller than the first shoulder 138. The seal 144 engages a radially reduced surface 146 (radially reduced relative to the internal threads 136) of the cap 134 for preventing fluid passage thereby. The cap 134 further includes a radially extended portion 148 extending upward from a plateau portion 150. An elongated cap aperture 152 is defined through the portions 148,150 for receiving a sealed tapping apparatus rotational tool assembly 154, which enables a tool (not shown) to be employed for selective rotation of the tapping apparatus 70 without removal of the cap 134 and/or fluid leakage from the main passage 54.

The cap assembly 130, and specifically the tool assembly 154, includes an elongated bar member 160 nonrotatably connected to the cutter 72 and rotatable relative to the cap 134. As will be described in more detail below, the bar member 160 is rotatable through the cap aperture 152 to rotate the cutter 72. The cap assembly 130 further includes an elongated cylindrical sleeve member 164 rotatably received in the cap aperture 152. The sleeve member 164 is non-rotatably connected to the elongated bar member 160 such that rotation of the sleeve member 164 causes rotation of the elongated bar member 160 which in turn causes rotation of the cutter 72. In the illustrated embodiment, the sleeve member 164 is axially fixed relative to the cap 132, whereas the bar member 160 is axially movable relative to the sleeve member 164, but axially fixed relative to the cutter 72. Rotation of the axially fixed sleeve member 164 in a first direction (e.g., clockwise) rotates the bar member 160 in the first direction which in turn rotates the cutter 72 in the first direction to advance the cutter toward the conduit recess 26. Rotation of the axially fixed sleeve member 164 in a second, reverse direction (e.g., counter-clockwise) rotates the bar member 160 in the second direction which in turn rotates the cutter 72 in the second direction to retract the cutter away from the conduit recess 26. The bar member 160 moves axially relative to the sleeve member 164 and to the cap member 132 when the cutter 72 is advanced or retracted within the main passage 54.

The sleeve member 164 has a first end 164a defining a polygon shaped aperture 168a into which the bar member 160 is received. More particularly, the bar member 160 has a complementary polygon shape that closely fits into the polygon shaped aperture 168a of the sleeve member 164 to non-rotatably connect the bar member 160 and the sleeve member 164. In the illustrated embodiment, the bar member 160 can be a hex shaped bar member having a first end 160a cooperatively received and/or engaged within the hex shaped recess 90 of the tapping apparatus 70. A spring pin 162 can be received through the cutter 72 and the hex bar 160 adjacent the end 92 of the cutter and the end 160a of the bar member to secure the cutter 72 and bar member 160 together. The bar member 160 can be elongated such that a second end 160b extends or protrudes axially outward relative to the passage 54 defined in the tower 50. With the bar member 160 being hex shaped, the second end 160b is likewise hex shaped and thus the aperture 168 can be hex shaped so as to match and complement the portion of the bar member received therein.

As shown, the second end 160b of the bar member 160 can be secured to the elongated cylinder member 164 by a plug or plug member 166. Specifically, the elongated cylinder member 164 can have a length such that the first end 164a is connected by the plug 166 to the end 160b of the bar member 160 and a second end 164b extends from and/or protrudes from the radially extended portion 148 of the cap 134. As illustrated, the elongated cylinder member 164 can define an aperture 168 through an axial length thereof (i.e., aperture portion 168a being but a portion of aperture 168) such that the plug 166 is received through the aperture for securing the bar member 160 to the cylinder member 164. The second end 164b can also be provided with an appropriate tool engaging surface or surfaces 170, such as external hex surfaces, which can be rotated with an appropriate tool (not shown).

Seals 172,174, such as o-ring seals, are received in respective grooves 176,178 defined in an external surface of the plug 166 for preventing fluid communication between the cylinder member 164 and the plug 166. In particular, the seals 172,174 engage an interior surface of the cylinder member 164 that defines the aperture 168 to prevent fluid leakage thereby. As shown, the plug 166 includes an insertion or plug portion 166a which is received axially within the end 160a of the bar member 160 and a second or sealing portion 166b, the portion that defines the grooves 178,180, which is only slightly smaller diametrically relative to the surface of the cylinder member 164 that defines the elongated aperture 168, particularly circular shaped aperture portion 168b.

An external surface 182 of the cylinder member 164 can include circumferential grooves 184,186 for respectively receiving seals 188,190 for sealing between the external surface 182 of the cylinder member and the internal surface of the cap 134 that defines the elongated aperture 152. Retaining rings 192,194 can be provided annularly about the cylinder member 164 sandwiching the radially extending portion 148 of the cap 134 therebetween to limit relative axial movement of the cylinder member relative to the cap 134. If desirable, appropriate washers 196,198 can also be provided annularly about the cylinder member 164 as shown for cooperating with the retaining rings 192,194.

Operation of the tapping tee assembly 10, and a method for tapping the main conduit with the tapping tee assembly 10, will be described hereafter. As previously indicated, with the conduit received in the conduit recess 26 the saddle members 14, 16 (i.e., the body) are positioned about the circumference of the main conduit 12 and the upper and lower clamp portions 14, 16 are secured to one another using the provided fastening arrangement.

The assembled tapping apparatus 70 can be predisposed in the main passage 44, particularly with the cutter threaded portion 86 disposed adjacent the upper end 54a of the main passage. The annular cutting edge 78 of the cutter 72 can be advanced toward the main conduit by means of the threaded engagement between the cutter 72 and the threaded portion 46 of the main passage 44. More specifically, a tool (not shown) can be used to impart a rotational force on the cutter 72 in a first direction with respect to the branch 52 to advance the cutter toward the main conduit. Unlike many prior art tapping tees, the illustrated tapping tee 10 does not need to have its cap 134 removed to provide access to the tapping apparatus 70. Rather, a tool can be used on the exposed surfaces 170 to rotate the tapping apparatus 70, and specifically the cutter 72, without removal of the cap 134. Continued rotation and advancement by the cutter 72 ultimately causes it to form an aperture through the sidewall of the main conduit. Upon completion of the main conduit cutting process, a plug or coupon is circumferentially retained within the cutter recess 102 with the threads 106 facilitating such retention.

Still further continued rotation and advancement of the cutter 72 then causes the sleeve 74 to forcibly enter the conduit. In particular, the sleeve 74 has a diameter that slightly exceeds a diameter of the main conduit aperture. As expected, the diameter of the main conduit aperture generally matches the cutter 72, particularly the lower radial portion 76 of the cutter. Due to the sleeve's slightly larger diameter and its threads 112, the sleeve 74 threadedly engages with the sidewall of the conduit via the sleeve's threads 112 as the sleeve is forcibly advanced into the conduit by the cutter 72. This threaded relationship ensures a leakproof connection between the sleeve 74 and the conduit (i.e., fluid is prevented from passing between the exterior threaded surface of the sleeve 74 and the conduit sidewall to which the sleeve is threadedly engaged).

During advancement of the sleeve 74 through the sidewall of the main conduit, the sleeve 74 will have a tendency to advance at a faster rate than the cutter 72 due to the lower thread pitch of the sleeve threads 112 (i.e., more threads per inch) relative to the thread pitch of the cutter threads 88. Thus, as discussed more fully in the afore-referenced '395 patent, the sleeve 74 can become axially separated from the cutter 72 (i.e., the ratchet elements 98,120 can become separated) at selected stages of axial advancement of the tapping apparatus, particularly as the sleeve 72 begins to cut and threadedly engage the main conduit.

One purpose of the differential threaded relationship between the cutter 72 and the sleeve 72 is to ensure that an external surface of the conduit is held in sealing engagement with the upper clamp portion 14 via the o-ring retained in the groove 38 that surrounds the main conduit aperture, particularly during advancement of the sleeve 74 into the conduit. The effect of the different thread pitches on the cutter 72 and the sleeve 74 is an urging or pulling of the main conduit into tight sealing engagement with the upper clamp portion 14 (and the seal) during the advancement of the sleeve into the main conduit. Though the cutter 72 and sleeve 74 may become temporarily separated during axial advancement of the tapping apparatus 70, continued rotation and axial advancement of the cutter 72 toward the main conduit ultimately results in cooperative engagement between the ratchet elements 98, 120 for continued rotation and axial movement of the sleeve 74 into the sidewall of the main conduit as already described.

Figure 1:
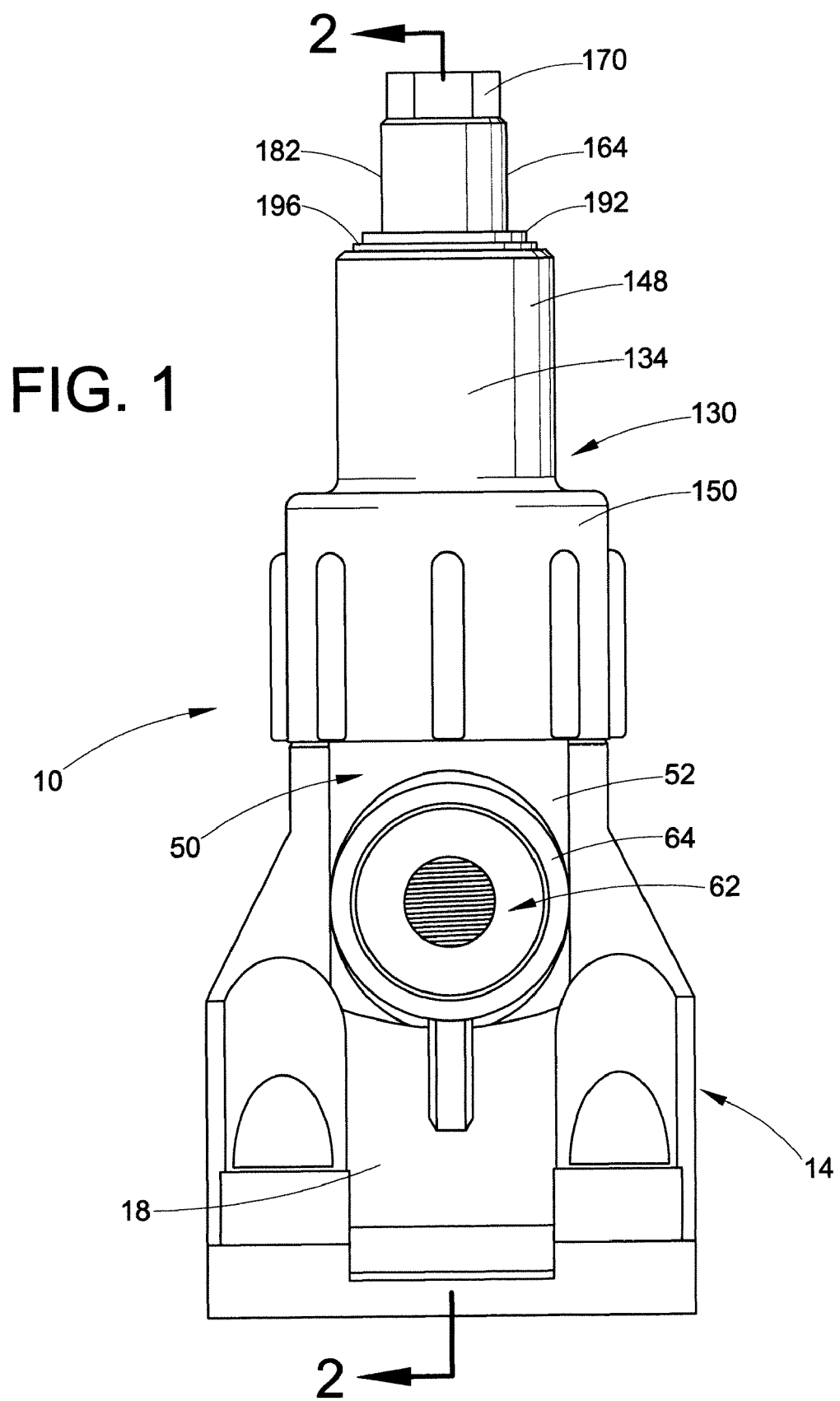
FIG. 1 is an end elevational view of an upper clamp portion of an improved tapping tee assembly having an improved cap assembly that provides access to a tapping apparatus without requiring removal of a cap.
Figure 2:
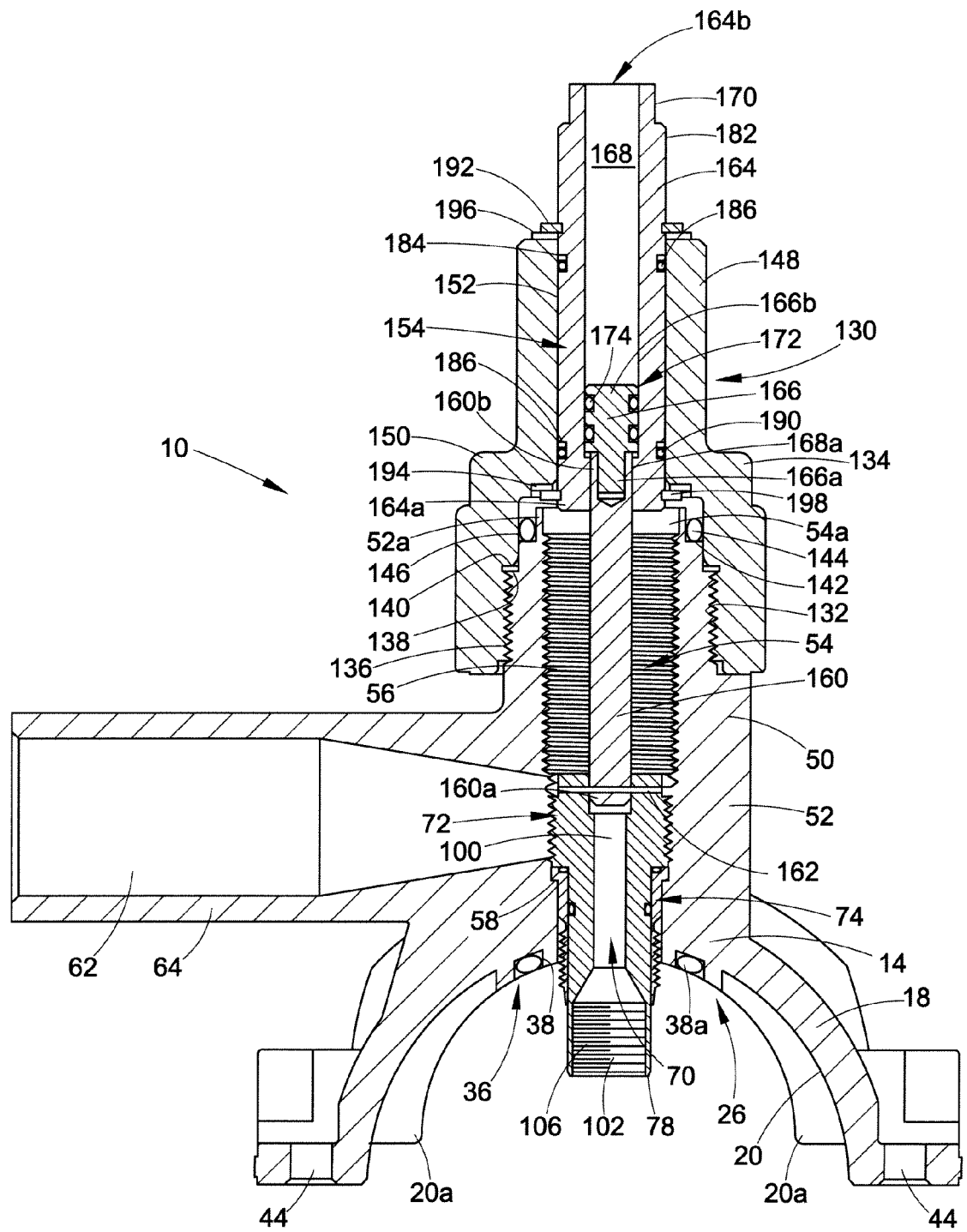
FIG. 2 is a cross section view of the upper clamp portion taken along line 2-2 of FIG. 1, particularly illustrating a tapping assembly shown in an advanced position.
Figure 3:
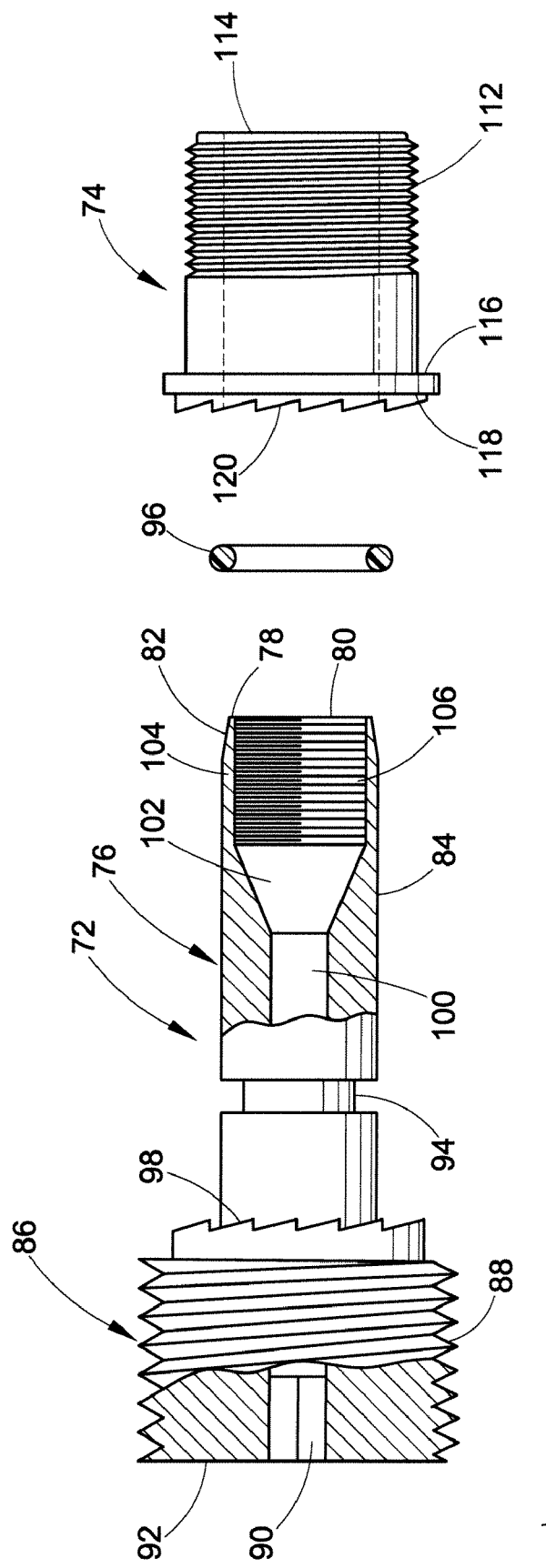
FIG. 3 is an enlarged view shown in partial cross section of the separate components that cooperate to define the tapping assembly of FIG. 2.
Figure 4:
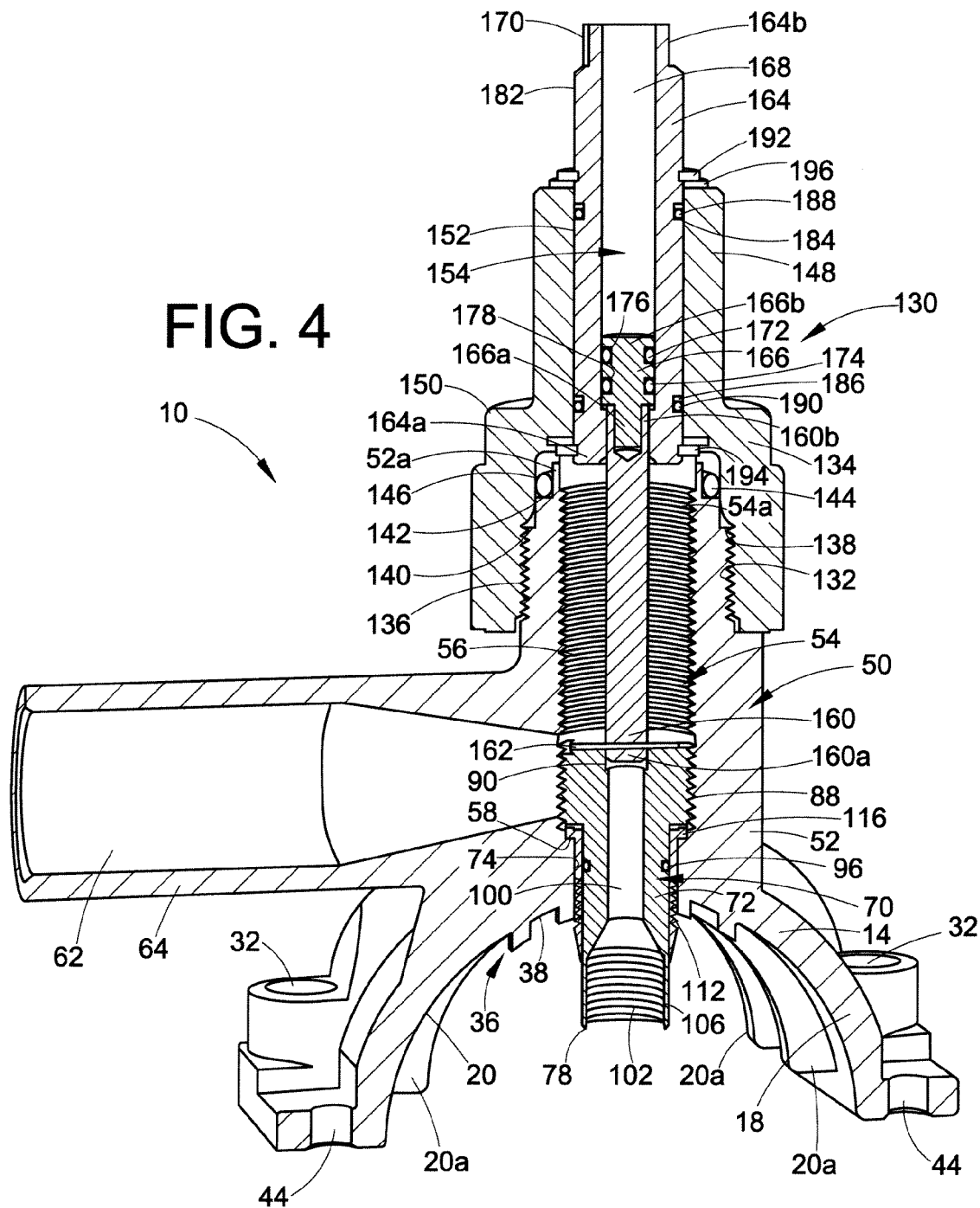
FIG. 4 is a perspective cross section view of the upper clamp portion of FIG. 2.

Axial advancement of the sleeve 74 is limited by the internal shoulder 58 of the tower 50. More particularly, the sleeve 74 can be advanced in the direction of the main conduit 14 until the sleeve shoulder 116 engages the internal shoulder 58 (the position shown in FIGS. 2 and 4). This provides a positive feedback to the user or installer that the sleeve 74 is fully in position and that the main conduit coupon has been cut from the main conduit. Moreover, the shoulder 116 cooperates with the internal shoulder 58 in the tapping tower 50 to limit advancement of the sleeve first end 114 into the main conduit. In this way, only a minimal amount of the sleeve 74 extends into the fluid path defined by the main conduit. Still further, the sleeve 74 provides substantial resistance against pull out forces, i.e., forces directed along the longitudinal axis of the tower 50. In addition, the threaded sleeve 74 stabilizes the tapping assembly 70 against movement in a circumferential direction of the main conduit and also along the longitudinal axis of the main conduit. This, in conjunction with the clamping arrangement provided by the clamp portions, secures the tapping tee assembly 10 along the main conduit.

If not already installed, associated piping can now be joined to the second branch 64 and then the cutter 72 can be retracted from the conduit and separated from the sleeve 74. The threaded engagement of the sleeve 74 and the conduit is sufficient to overcome the frictional connection between the seal 96 and the sleeve 74 such that retraction of the cutter 70 leaves the sleeve in position in the conduit. The threaded retraction of the cutter 72 can continue until the terminal edge of the second end 92 of the cutter 72 is flush with the top of the tapping tower 50.

The exemplary embodiment or embodiments have been described with reference to preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A mechanical tapping tee assembly for fluidly connecting to a conduit, the assembly comprising:
   a body defining a conduit recess for receiving the conduit in close relation relative to said body and further defining a main passage for fluidly connecting said conduit recess to a branch passage, said main passage defined in said body with a first end adjacent said conduit recess and a second, open end spaced apart from said first end;
   a threaded cutter received in said main passage and threadedly engaged with a threaded region of said main passage for selective advancement and retraction within said main passage upon rotation relative to said body, said cutter including a cutting edge for, upon selective advancement toward the conduit received in said conduit recess, cutting through a sidewall of the conduit to establish fluid communication between said main passage and the conduit; and
   a cap assembly including a cap fixedly secured to said body for closing the second, open end of said main passage, an elongated bar member rotatably connected to said cutter and rotatable relative to said cap, said cap defining a cap aperture through which said elongated bar member is rotatable to rotate said cutter, an elongated cylindrical sleeve member rotatably received in said cap aperture, said sleeve member nonrotatably connected to said elongated bar member such that rotation of said sleeve member causes rotation of said elongated bar member which in turn causes rotation of said cutter, and said cap assembly allowing rotation of said cutter received in said main passage without removal of said cap assembly from said body.

2. The mechanical tapping tee assembly of claim 1 wherein said sleeve member is axially fixed relative to said cap, and wherein said bar member is axially movable relative to said sleeve member and axially fixed relative to said cutter, rotation of said axially fixed sleeve member in a first direction rotates said bar member in said first direction which in turn rotates said cutter in said first direction to advance said cutter toward said conduit recess, rotation of said axially fixed sleeve member in a second, reverse direction rotates said bar member in said second direction which in turn rotates said cutter in said second direction to retract said cutter away from said conduit recess, said bar member moving axially relative to said sleeve member and said cap member when said cutter is advanced or retracted within said main passage.

3. The mechanical tapping tee assembly of claim 1 wherein at least one seal is radially disposed between said cap and said sleeve member that is rotatable relative to said cap for sealing therebetween.

4. The mechanical tapping tee assembly of claim 1 wherein said sleeve member has a first end defining a polygon shaped aperture into which said bar member is received, said bar member having a complementary polygon shape that closely fits into said polygon shaped aperture of said sleeve member to nonrotatably connect said bar member and said sleeve member.

5. The mechanical tapping tee assembly of claim 4 further including a sealing arrangement disposed between said sleeve member and said bar member to seal therebetween and prevent fluid flow from escaping from said main passage.

6. The mechanical tapping tee assembly of claim 5 wherein said sealing arrangement includes a plug having a plug portion axially received in an adjacent end of said bar member and a sealing portion disposed in a circular shaped aperture portion of said sleeve member, at least one seal is annularly received in at least one circumferential groove defined in said plug portion for radially sealing between said plug portion and said sleeve member.

7. The mechanical tapping tee assembly of claim 4 wherein said bar member has a first end axially fixed and nonrotatably secured to said cutter and a second end nonrotatably secured to said sleeve member, said second end axially movable relative to said sleeve member.

8. The mechanical tapping tee assembly of claim 1 wherein said cap is threadedly received on said body to close said second, open end of said main passage, said cap assembly further including an annular seal radially disposed between said cap and said body to seal therebetween.

9. The mechanical tapping tee assembly of claim 1 wherein a sleeve is received around said cutter and includes external threads adapted to thread into a sidewall of the conduit after a conduit coupon of the conduit is removed and remain threadedly engaged with the conduit sidewall when said cutter is retracted with the conduit coupon.

10. The mechanical tapping tee assembly of claim 9 further including a one-way drive connection having an engaging surface between said sleeve and said cutter to selectively engage one another so that said sleeve is threaded into engagement with the sidewall and retained in place when said cutter is retracted in said body with the conduit coupon retained therein.

11. The mechanical tapping tee assembly of claim 1 wherein said body includes a first clamp portion and a second clamp portion, each of said first and second clamp portions having an arcuate saddle section having a generally semi-cylindrical inner surface adapted to closely conform to an outside surface of the conduit, said inner surface of each of said first and second clamp portions defines said conduit recess in which the conduit is received, a fastening arrangement secures said first and second clamp portions to one another for providing clamping engagement about the outer surface of the conduit when the conduit is disposed in said conduit recess between said first and second clamping portions.

12. The mechanical clamping tee assembly of claim 11 wherein said fastening arrangement includes a plurality of fasteners formed integrally with or molded-in one of said first and second clamping portions, the plurality of fasteners extending upwardly through corresponding apertures defined in the other of said first and second clamping portions with threaded members threadedly received on distal portions of said fasteners that extend through said corresponding apertures to clamp said first and second portions onto the conduit.

13. The mechanical clamping tee of assembly claim 11 wherein said first portion defines an annular recess in which a seal is received for sealing between said body and the conduit when said first and second clamping portions are secured together and clamped onto the conduit, said annular recess and said seal being located on said inner surface so as to be annularly disposed about a location at which said cutter cuts through the sidewall of the conduit.

14. The mechanical tapping tee assembly of claim 1 wherein said body includes a tapping tee tower that extends away from said conduit recess and has said main passage defined therein, said tapping tee tower having a branch extending from said tower and defining said branch passage fluidly connected to the main passage for fluidly connecting to another component, said branch and said branch passage oriented orthogonally relative to a plane defined by an axis of the main passage and the conduit.

* * * * *